(12) United States Patent
Tang et al.

(10) Patent No.: US 11,627,396 B2
(45) Date of Patent: *Apr. 11, 2023

(54) RANGE EXTENDER DEVICE

(71) Applicant: Google LLC, Mountain View, CA (US)

(72) Inventors: Vivian W. Tang, Mountain View, CA (US); Li Ya Wang, New Taipei (TW); Yu-Ming Chen, Taipei (TW); Mihika Hemmady, San Francisco, CA (US); DuanYing Lin, New Taipei (TW); Yau-Shing Lee, Sunnyvale, CA (US); Frédéric Heckmann, Taipei (TW)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,371

(22) Filed: Apr. 7, 2022

(65) Prior Publication Data

US 2022/0232305 A1 Jul. 21, 2022

Related U.S. Application Data

(63) Continuation of application No. 17/001,598, filed on Aug. 24, 2020, now Pat. No. 11,363,359, which is a
(Continued)

(51) Int. Cl.
*H04R 1/02* (2006.01)
*G06F 3/16* (2006.01)
(Continued)

(52) U.S. Cl.
CPC ............ *H04R 1/025* (2013.01); *G06F 3/167* (2013.01); *H04R 1/345* (2013.01); *H04R 9/022* (2013.01); *F21V 33/0056* (2013.01)

(58) Field of Classification Search
None
See application file for complete search history.

(56) References Cited

U.S. PATENT DOCUMENTS 8,994,276 B2 3/2015 Recker et al.
9,234,668 B2 1/2016 Fadell et al.
(Continued)

FOREIGN PATENT DOCUMENTS

AU 2020220148 4/2021
CN 203788428 8/2014
(Continued)

OTHER PUBLICATIONS

"Foreign Notice of Allowance", KR Application No. 10-2021-7039076, dated Feb. 28, 2022, 3 pages.
(Continued)

*Primary Examiner* — Walter F Briney, III
(74) *Attorney, Agent, or Firm* — Colby Nipper PLLC

(57) ABSTRACT

This document describes techniques and systems that enable a range extender device. The techniques and systems include a user device that includes a housing with an audio sensor, a heat sink assembly, a circuit board assembly, and a speaker assembly positioned within the housing. The housing includes a top housing member connected to a bottom housing member. The top housing member includes a concave-down top-end portion connected to a generally-cylindrical vertical wall via rounded corners. The heat sink assembly includes a heat sink and one or more antennas positioned proximate to an inner surface of the vertical wall. The circuit board assembly is positioned within the housing and proximate to the heat sink assembly, and the speaker assembly is positioned within the housing and connected to the circuit board assembly. Also, a light ring assembly is connected to a bottom exterior surface of the bottom housing member.

20 Claims, 14 Drawing Sheets

Related U.S. Application Data continuation of application No. PCT/US2019/053225, filed on Sep. 26, 2019.

(51) Int. Cl.
  *H04R 1/34* (2006.01)
  *H04R 9/02* (2006.01)
  *F21V 33/00* (2006.01)

(56) References Cited

U.S. PATENT DOCUMENTS

| | | | |
|---|---|---|---|
| 9,721,586 | B1 | 8/2017 | Bay et al. |
| 9,864,576 | B1 | 1/2018 | Liu et al. |
| 10,290,302 | B2 | 5/2019 | Heckmann et al. |
| 10,448,538 | B1 | 10/2019 | Gaul et al. |
| 11,363,359 | B2 * | 6/2022 | Tang .............. H04B 1/3888 |
| 2008/0192975 | A1 | 8/2008 | Ito |
| 2010/0201878 | A1 | 8/2010 | Barenbrug et al. |
| 2014/0320628 | A1 | 10/2014 | Chen |
| 2015/0264461 | A1 | 9/2015 | Hovanky et al. |
| 2016/0073479 | A1 | 3/2016 | Erchak et al. |
| 2016/0345086 | A1 | 11/2016 | Chamberlin et al. |
| 2018/0190285 | A1 | 7/2018 | Heckman et al. |
| 2018/0191930 | A1 | 7/2018 | Jeong et al. |
| 2019/0020714 | A1 | 1/2019 | Lee et al. |
| 2019/0052942 | A1 | 2/2019 | Pavelic |
| 2019/0069078 | A1 | 2/2019 | Johnson et al. |
| 2019/0259385 | A1 | 8/2019 | Heckmann et al. |
| 2019/0268177 | A1 | 8/2019 | Li |
| 2019/0394547 | A1 | 12/2019 | Lemons et al. |
| 2021/0099779 | A1 | 4/2021 | Tang et al. |

FOREIGN PATENT DOCUMENTS

| | | |
|---|---|---|
| CN | 207530995 | 6/2018 |
| CN | 108650185 | 10/2018 |
| EP | 3399768 | 11/2018 |
| EP | 3824560 | 5/2021 |
| JP | 2018186511 | 11/2018 |
| KR | 20180075657 | 7/2018 |
| TW | M501712 | 5/2015 |
| TW | M504351 | 7/2015 |
| TW | M535445 | 1/2017 |
| WO | 2016057752 | 4/2016 |
| WO | 2018057146 | 3/2018 |
| WO | 2018125632 | 7/2018 |
| WO | 2018237398 | 12/2018 |
| WO | 2021061130 | 4/2021 |

OTHER PUBLICATIONS

"Foreign Office Action", TW Application No. 109130052, dated Mar. 8, 2021, 7 pages.
"Foreign Office Action", KR Application No. 10-2020-7027620, dated Aug. 23, 2021, 6 pages.
"Foreign Office Action", JP Application No. 2020-0158672, dated Oct. 19, 2021, 5 pages.
"Foreign Office Action", EP Application No. 19783948.3, dated Oct. 20, 2021, 8 pages.
"Foreign Office Action", CA Application No. 3,093,897, dated Oct. 28, 2021, 4 pages.
"Foreign Office Action", IN Application No. 202044039406, dated Nov. 30, 2021, 6 pages.
"Foreign Office Action", CN Application No. 202022047808.9, dated Dec. 9, 2020, 5 pages.
"Foreign Office Action", AU Application No. 2020220148, dated Mar. 22, 2021, 8 pages.
"International Search Report and Written Opinion", Application No. PCT/US2019/053225, dated Jun. 8, 2020, 13 pages.
"Non-Final Office Action", U.S. Appl. No. 17/001,598, dated Oct. 15, 2021, 18 pages.
"Notice of Allowance", U.S. Appl. No. 17/001,598, dated Feb. 16, 2022, 8 pages.
"Foreign Office Action", CN Application No. 202010982344.2, dated Apr. 26, 2022, 25 pages.
"International Preliminary Report on Patentability", Application No. PCT/US2019/053225, dated Mar. 15, 2022, 8 pages.
"Extended European Search Report", EP Application No. 22177665.1, dated Sep. 8, 2022, 9 pages.
"Foreign Office Action", CN Application No. 202010982344.2, dated Sep. 28, 2022, 20 pages.
"Foreign Office Action", AU Application No. 2021261829, dated Oct. 26, 2022, 3 pages.
"Foreign Office Action", CA Application No. 3093897, dated Aug. 5, 2022, 4 pages.
"Foreign Office Action", TW Application No. 110131832, dated Dec. 7, 2022, 9 pages.

\* cited by examiner

RANGE EXTENDER DEVICE

RELATED APPLICATION(S)

This application is a continuation of U.S. patent application Ser. No. 17/001,598, filed on Aug. 24, 2020, which in turn is a continuation of International Application Serial No. PCT/US2019/053225, filed Sep. 26, 2019, the disclosures of which are incorporated in their entireties by reference herein.

BACKGROUND

Range-extender devices can be large and visually unappealing due to hardware constraints. Some of these devices include external antennas that, based on the device's location within a user's home, are within reach of small children or animals that may move or damage the antennas. Range-extender devices can include complex controls and status lights that can be difficult for some users to understand. These aspects of conventional range-extender devices can frustrate users and diminish their user experience.

SUMMARY

This document describes a range extender device and associated systems of methods. The range extender device described herein includes a housing that is substantially cylindrical with smooth, rounded edges. The described range extender device has improved robustness, simplicity, and compactness in comparison to conventional range extender devices. As further described herein, the range extender device includes a housing with an audio sensor, a heat sink assembly, a circuit board assembly, and a speaker assembly positioned within the housing. The housing includes a top housing member connected to a bottom housing member. The top housing member includes a concave-down top-end portion connected to a generally cylindrical vertical wall via rounded corners. The heat sink assembly includes a heat sink and one or more antennas positioned proximate to an inner surface of the vertical wall. The circuit board assembly is positioned within the housing and proximate to the heat sink assembly, and the speaker assembly is positioned within the housing and connected to the circuit board assembly. Also, a light ring assembly is connected to a bottom exterior surface of the bottom housing member.

This summary is provided to introduce simplified concepts of a range extender device, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a range extender device are described in this document with reference to the following drawings. The same numbers are used throughout the drawings to reference like features and components.

DETAILED DESCRIPTION

Overview

Figure 1:
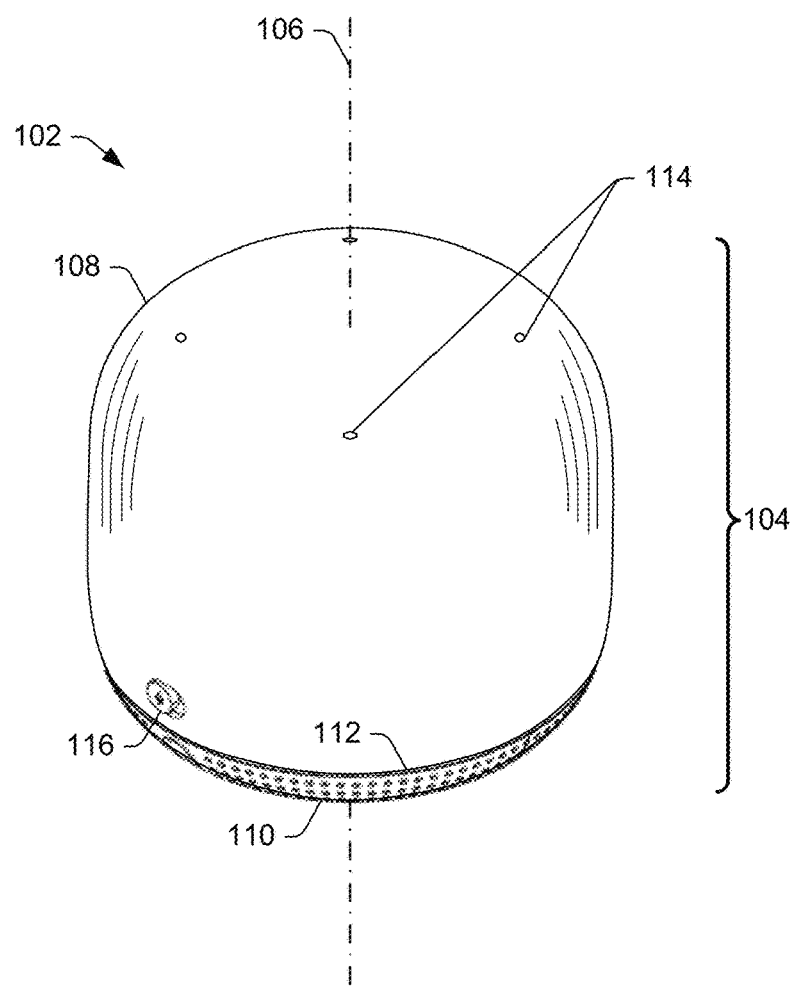
FIG. 1 illustrates a top rear perspective view of an example implementation of a range extender device.

This document describes a range extender device and associated systems of methods. The range extender device described herein has improved robustness, simplicity, and compactness compared to conventional range-extenders.

In aspects, a range extender device is disclosed. The range extender device includes a housing having top and bottom housing members, an audio sensor, a heat sink assembly, a circuit board assembly, a speaker, and a light ring assembly. The housing includes a top housing member having a generally cylindrical vertical wall and a top-end portion connected to a first end of the vertical wall via rounded corners, the vertical wall being generally cylindrical around a central axis and having an inner surface and an opposing outer surface, at least a portion of the vertical wall having non-uniform thickness in a direction of the longitudinal axis based on the outer surface of the vertical wall being curved in the direction of the longitudinal axis, and the inner surface of the vertical wall being substantially parallel to the longitudinal axis, the top-end portion being concave down in a side view of the top-end portion. The bottom housing member is connected to the top housing member at a second end of the vertical wall, the bottom housing member having a bottom exterior surface and an opposing interior surface, the bottom exterior surface defining a plane that is substantially perpendicular to the central axis, the bottom housing member comprising a curved edge between the bottom exterior surface and the vertical wall of the top housing member. The audio sensor is positioned within the housing and proximate to the top-end portion of the top housing member. The heat sink assembly includes a heat sink and one or more antennas, the heat sink having a cylindrical shape with a radius that is within a tolerance threshold distance smaller than a radius of the inner surface of the vertical wall of the top housing member. The circuit board assembly is positioned within the housing and proximate to the heat sink assembly, the circuit board assembly communicatively coupled to the one or more antennas to cause the one or more antennas to provide a radio node for a wireless mesh network. The speaker assembly is positioned within the housing and connected to the circuit board assembly; the speaker assembly aligned with a plurality of holes in the bottom housing member. The light ring assembly is connected to the bottom exterior surface of the bottom housing member, the light ring assembly configured to radially reflect light away from the central axis and diffuse the light to provide a glow under the bottom housing member.

In aspects, a system is disclosed. The system includes a plurality of antennas, a circuit board assembly, a heat sink, a microphone, a speaker assembly, and a housing. The plurality of antennas are configured to transmit and receive communication signals. The circuit board assembly is communicatively connected to the plurality of antennas to provide a radio node to a wireless mesh network. The heat sink is positioned proximate to the circuit board. The microphone is connected to the circuit board. The speaker assembly is connected to the circuit board such that the circuit board is located between the speaker assembly and the heat sink. The housing having a generally-cylindrical shape around a central axis and including first and second housing members. The first and second housing members are connected to one another to form an enclosure around the plurality of antennas, the circuit board assembly, the heat sink, the microphone, and the speaker assembly. The first housing member includes a cylindrically-shaped vertical wall with an inner surface that is substantially parallel to the central axis. The second housing member includes a plurality of holes aligned with the audio output device. The light ring assembly is configured to provide a glow underneath the second housing member.

These are but a few examples of how the described techniques and devices may be used to enable a range extender device. Other examples and implementations are described throughout this document. The document now turns to an example device, after which example systems are described.

Example Device

FIG. 1 illustrates a top rear perspective view 100 of an example implementation of a range extender device 102. The range extender device 102 includes a housing 104 that has a substantially cylindrical shape with rounded edges. The housing 104 has a central axis 106 (e.g., longitudinal axis). The housing 104 has a smooth exterior surface with few visible features. In aspects, the housing 104 includes a top housing member 108 and a bottom housing member 110.

As is further described below, the housing includes a seam 112 on an outer surface of the housing 104. The seam 112 is aligned with a location at which the top housing member 108 attaches to the bottom housing member 110. The top housing member 108 may be connected (e.g., threaded, snapped, fastened, pressed, glued, ultrasonic welded, etc.) to the bottom housing member 110. The range extender device 102 also includes holes 114, in the top housing member 108, that are aligned with audio sensors (not shown in FIG. 1), positioned within the housing 104, for receiving audio input (e.g., voice commands) from a user. The bottom housing member 110 includes a privacy switch 116 to disable or turn off the audio sensors.

The range extender device 102 lengthens the reach of an existing Wi-Fi network. In some aspects, the range extender device can serve as a node to a wireless mesh network. For example, the range extender device can wirelessly communicate with an access point at a user's home to extend the range of a local wireless network.

Figure 2:
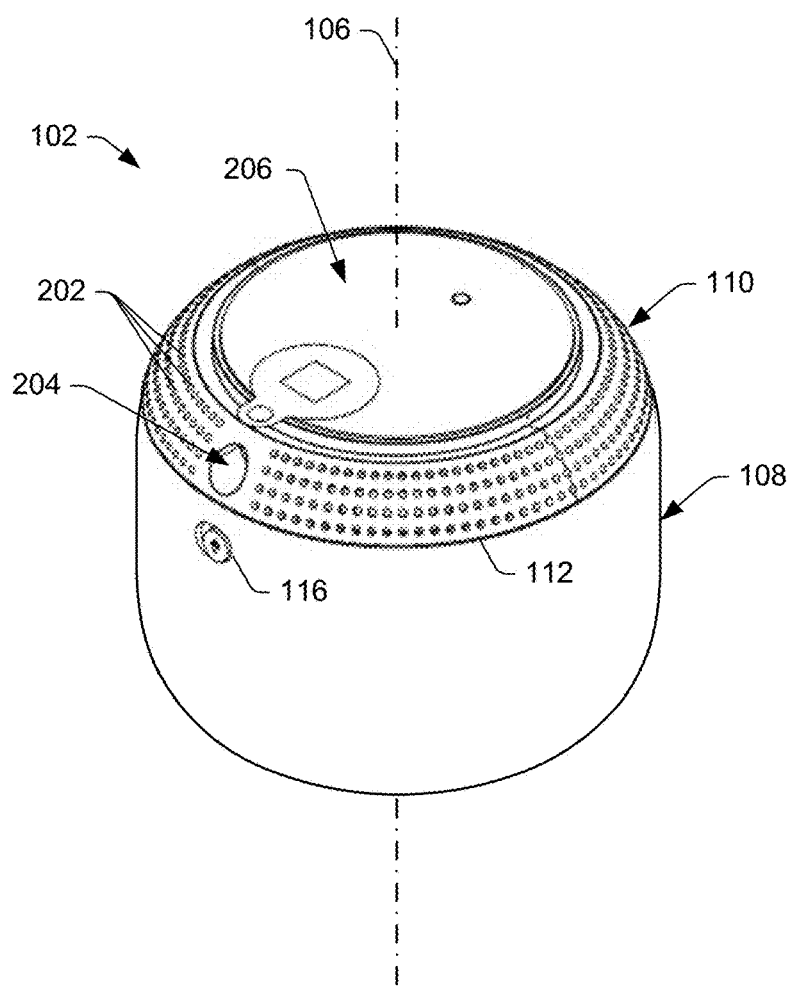
FIG. 2 illustrates a bottom rear perspective view of an example implementation of the range extender device from FIG. 1.

FIG. 2 illustrates a bottom rear perspective view 200 of an example implementation of the range extender device from FIG. 1. Here, the bottom housing member 110 includes a plurality of holes 202. The holes 202 are perpendicular to the exterior surface of the bottom housing member 110. The holes 202 are aligned with an audio output device (e.g., speaker) within the housing 104 to provide a path for audio output from the audio output device. In addition, the bottom housing member 110 includes an opening 204, through the housing 104, aligned with an electrical power connector, such as a barrel jack, of the range extender device 102. As is described further below, a light ring assembly 206 is attached to the bottom housing member 110. The light ring assembly 206 provides a glow of light under the range extender device 102 that indicates different operational states of the device. The glow of light (also referred to as an "underglow") is diffused light that radiates underneath the range extender device 102, reflecting off of a surface upon which the range extender device 102 rests. In one example, the glow of light may be red or amber if the microphone is muted. The glow of light may flash a blue color if the range extender device 102 is actively on a call (e.g., a Wi-Fi call, a Voice-over-Internet Protocol (VoIP) call, etc.). Alternatively, the glow of light may be white when a user is interacting with a virtual assistant executing on the range extender device. Accordingly, the light ring assembly 206 may provide any suitable color and/or flash pattern for the underglow to indicate an operational state of the range extender device 102.

Figure 3A:
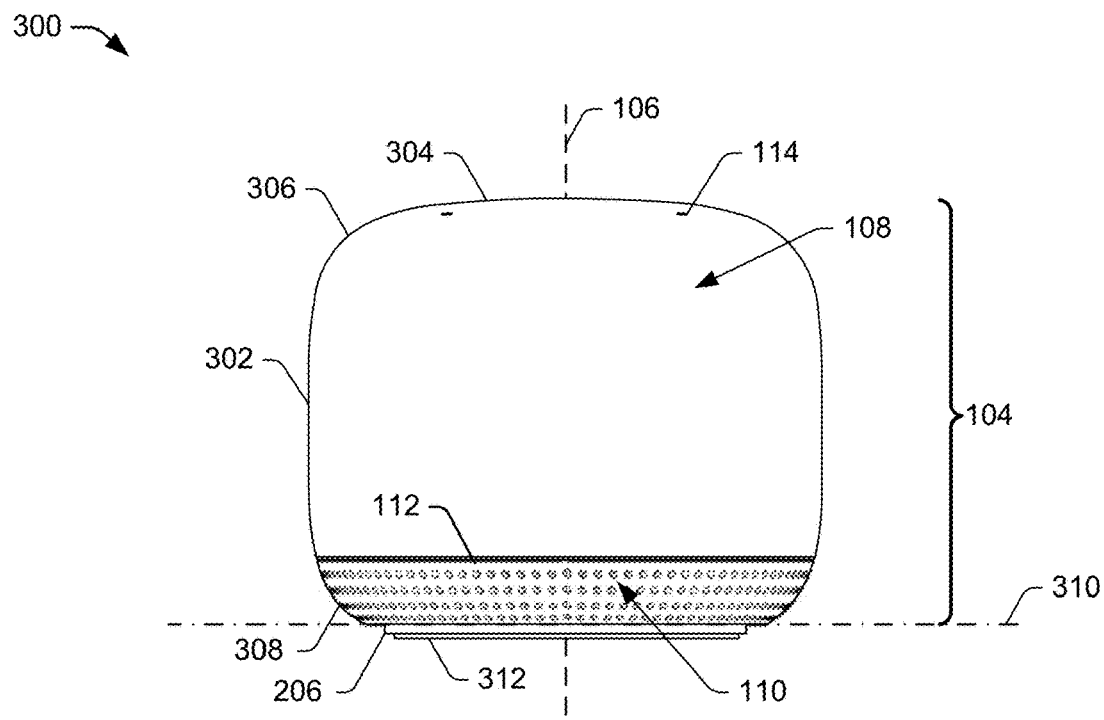
FIG. 3A illustrates a front elevational view of an example implementation of the range extender device from FIG. 1.

FIGS. 3A to 3D illustrate various elevational views of the range extender device 102. FIG. 3A illustrates a front elevational view 300 of the range extender device 102 with the central axis 106 displayed vertically. The top housing member 108 includes a vertical wall 302 that is generally cylindrical about the central axis 106 (e.g., having an x-axis radius substantially equal to a y-axis radius such that the x-axis radius is within an approximately ten millimeter tolerance of the y-axis). Also, the top housing member 108 includes a top-end portion 304 that is concave down in the front elevational view 300, such that the top-end portion 304 curves toward the vertical wall 302. The top-end portion 304 is connected to a first end (e.g., top end) of the vertical wall 302 via rounded edges 306.

The bottom housing member 110 shares the central axis 106 with the top housing member 108 and is connected to the top housing member 108 at a second end (e.g., bottom end) of the vertical wall 302, which is opposite the first end. The bottom housing member 110 includes rounded edges 308 that may have a similar radius to the rounded edges 306 of the top housing member 108. In the illustrated example, the bottom housing member 110 is substantially shorter in the direction of the central axis 106 than the top housing member 108, such that the seam 112 is located on the lower half of the housing 104. However, the bottom housing member 110 and the top housing member 108 can be any suitable height such that the seam 112 can be located at any location on the housing where the top housing member 108 is connected to the bottom housing member 110. A radius of the vertical wall 302 about the central axis 106 can be any suitable radius, such as a radius within a range of approximately 38 millimeters (mm) to approximately 65 mm.

The bottom housing member 110 includes a bottom exterior surface (not shown) that defines a plane 310. Connected to the bottom exterior surface of the bottom housing member 110 is the light ring assembly 206. Accordingly, the bottom housing member 110 is positioned between the top housing member 108 and the light ring assembly 206. A foot 312 is connected to the light ring assembly 206. The foot 312 can be formed of any suitable material (e.g., elastomer) with a sufficiently high friction coefficient to reduce sliding between the housing 104 and a surface upon which the housing 104 rests. In some aspects, the foot 312 may be adhered to the light ring assembly 206.

Figure 3B:
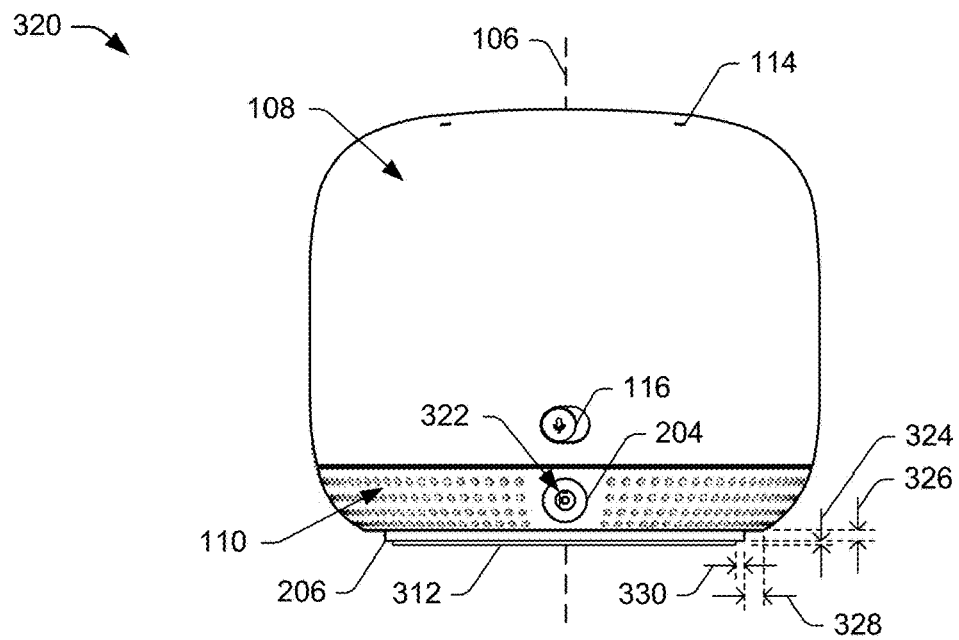
FIG. 3B illustrates a rear elevational view of an example implementation of the range extender device from FIG. 1.

FIG. 3B illustrates a rear elevational view 320 of the range extender device 102. As illustrated in the rear elevational view 320, the bottom housing member 110 includes the opening 204, which provides accessibility for a cable (e.g., power cable) to connect to an electrical power connector 322 within the housing to transfer electrical power to the range extender device 102. In some aspects, the privacy switch 116 may be vertically aligned with the opening 204. However, the privacy switch 116 can be positioned in any suitable location on the top housing member 108 that is conspicuous yet easy for a user to access quickly.

The foot 312 may be any suitable height y 324, such as a height that is within a range of approximately 0.3 mm to approximately 0.7 mm. The light ring assembly 206 may be any suitable height z 326, such as a height that is within a range of approximately 1.75 mm to approximately 2.25 mm. In addition, the light ring assembly 206 is inset from the corner of the bottom housing member 110 by a distance x 328, which may include any suitable distance within a range of approximately 3.5 mm to approximately 4.25 mm. The inset distance x 328 is representative of a difference between a radius of the light ring assembly 206 and a radius of the exterior surface of the bottom housing member 110. The foot 312 includes a radius that is smaller than the radius of the light ring assembly 206 by an amount equal to a distance q 330, such that the foot 312 is inset from an outer surface of the light ring assembly 206 by a space equal to the distance q 330. The distance q 330 can be any suitable distance that is within a range of approximately 1.25 mm to approximately 1.75 mm. The combination of heights 324 and 326 and inset distances 328 and 330 provide sufficient space underneath the housing 104 for the diffused light, provided by the light ring assembly 206, to radiate underneath the housing 104 and reflect off a surface, upon which the range extender device 102 is resting, with a particular intensity.

Figure 3C:
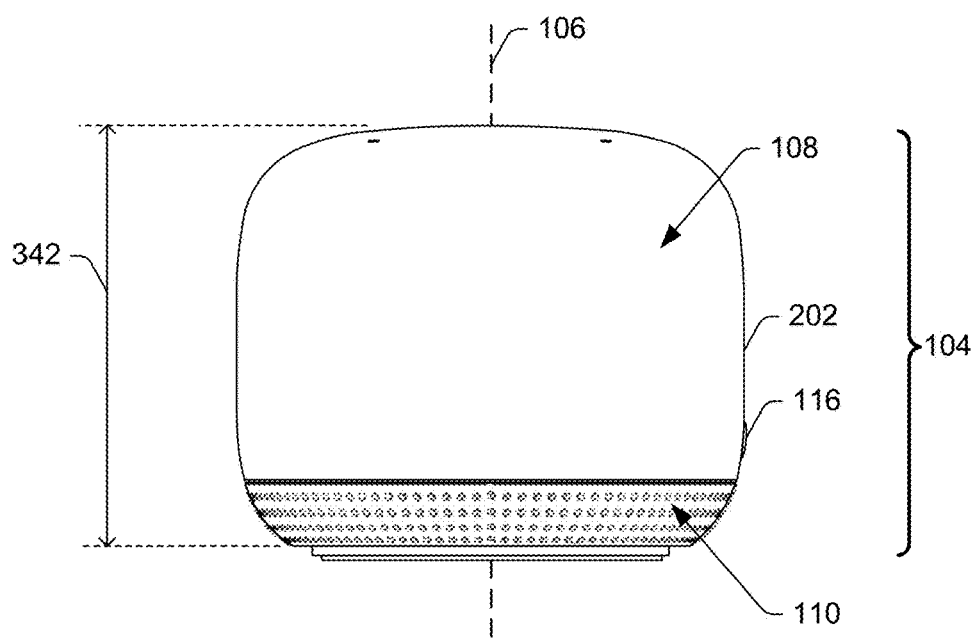
FIG. 3C illustrates a right elevational view of an example implementation of the range extender device from FIG. 1.
Figure 3D:
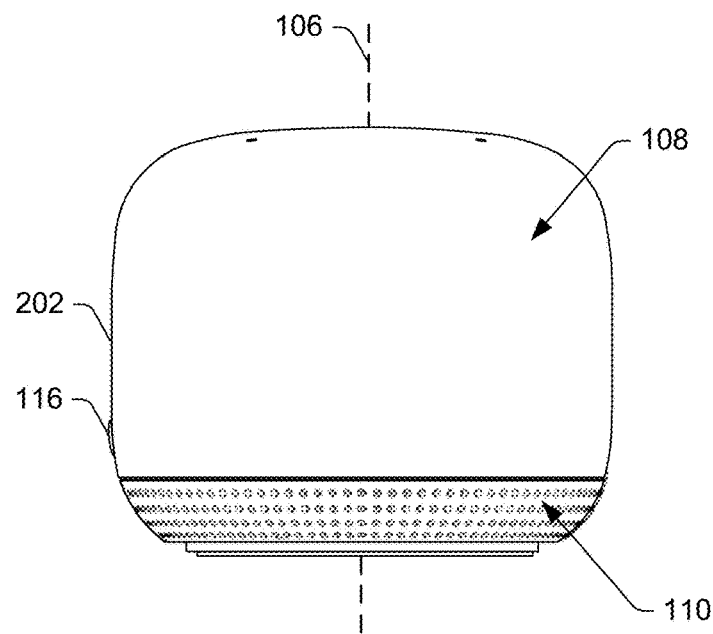
FIG. 3D illustrates a left elevational view of an example implementation of the range extender device from FIG. 1.

FIG. 3C illustrates a right elevational view 340 of the range extender device 102. FIG. 3D illustrates a left elevational view 350 of the range extender device 102. In aspects, the housing 104 has a height h 342 that is within a range of approximately 75 mm to approximately 90 mm. As illustrated, the range extender device 102 has a similar profile on the left and right sides. In some aspects, the privacy switch 116 may protrude outward from the vertical wall 202 of the top housing member 108. Alternatively, the privacy switch 116 may be flush with, or inset from, the outer surface of the vertical wall 202.

Figure 4:
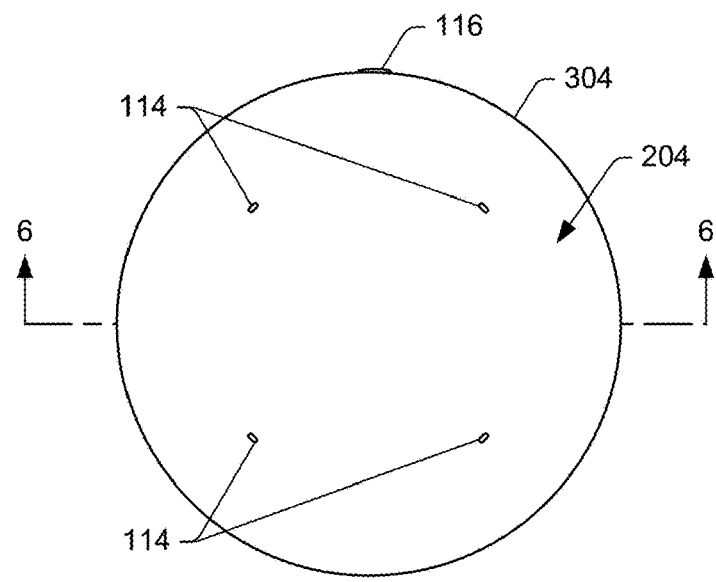
FIG. 4 illustrates a top plan view of an example implementation of the range extender device from FIG. 1.

FIG. 4 illustrates a top plan view 400 of the range extender device 102. In the top plan view 400, the top-end portion 304 of the top housing member 108 is shown and is generally circular. The top-end portion 304 includes a plurality of holes 114 that are aligned with audio sensors (not shown) within the housing 104 configured to receive audio input from a user, such as a voice command. The top plan view 400 includes a section line 6-6, which corresponds to a sectional view in FIG. 6.

Figure 5:
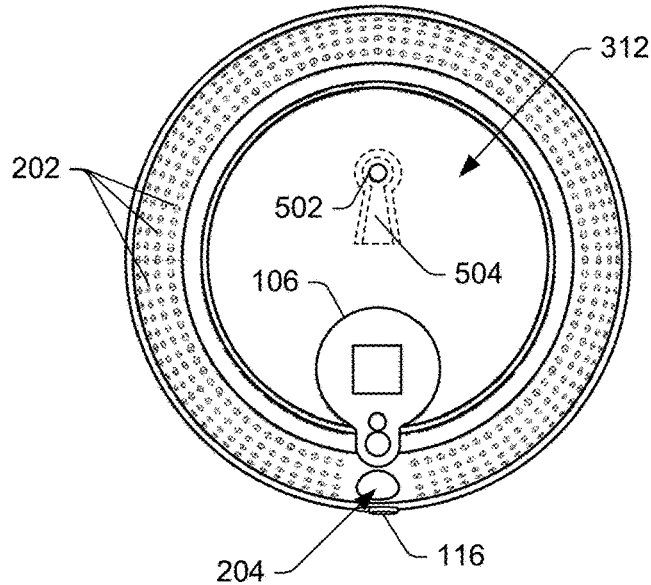
FIG. 5 illustrates a bottom plan view of an example implementation of the range extender device from FIG. 1.

FIG. 5 illustrates a bottom plan view 500 of the range extender device 102. The bottom housing member 110 includes the holes 202. The holes 202 can be arranged in any suitable pattern or arrangement on the bottom housing member 110. Here, the holes 202 are arranged in four rows along the rounded edge 308 of the bottom housing member 110. In addition, the foot 312 includes a recess 502 (e.g., indentation, hole) to indicate a location of a cantilever member 504 that is hidden (as represented by dotted lines) behind the foot 312, on the light ring assembly 206. The cantilever member 504 is formed within the light ring assembly 206 and connected to the light ring assembly 206 at a fulcrum. The cantilever member 504 is coplanar with the light ring assembly 206. The recess 502 is aligned with a free end of the cantilever member 504. The cantilever member 504 is bendable, by a force applied to the free end of the cantilever member 504 (e.g., at a location of the recess 502 on the foot 312), to interface with a reset mechanism (described below in relation to FIG. 10D) on a circuit board assembly that is positioned within the housing 104. In aspects, the cantilever member 504 acts as a reset button that the user can press to reset the range extender device 102.

Figure 6:
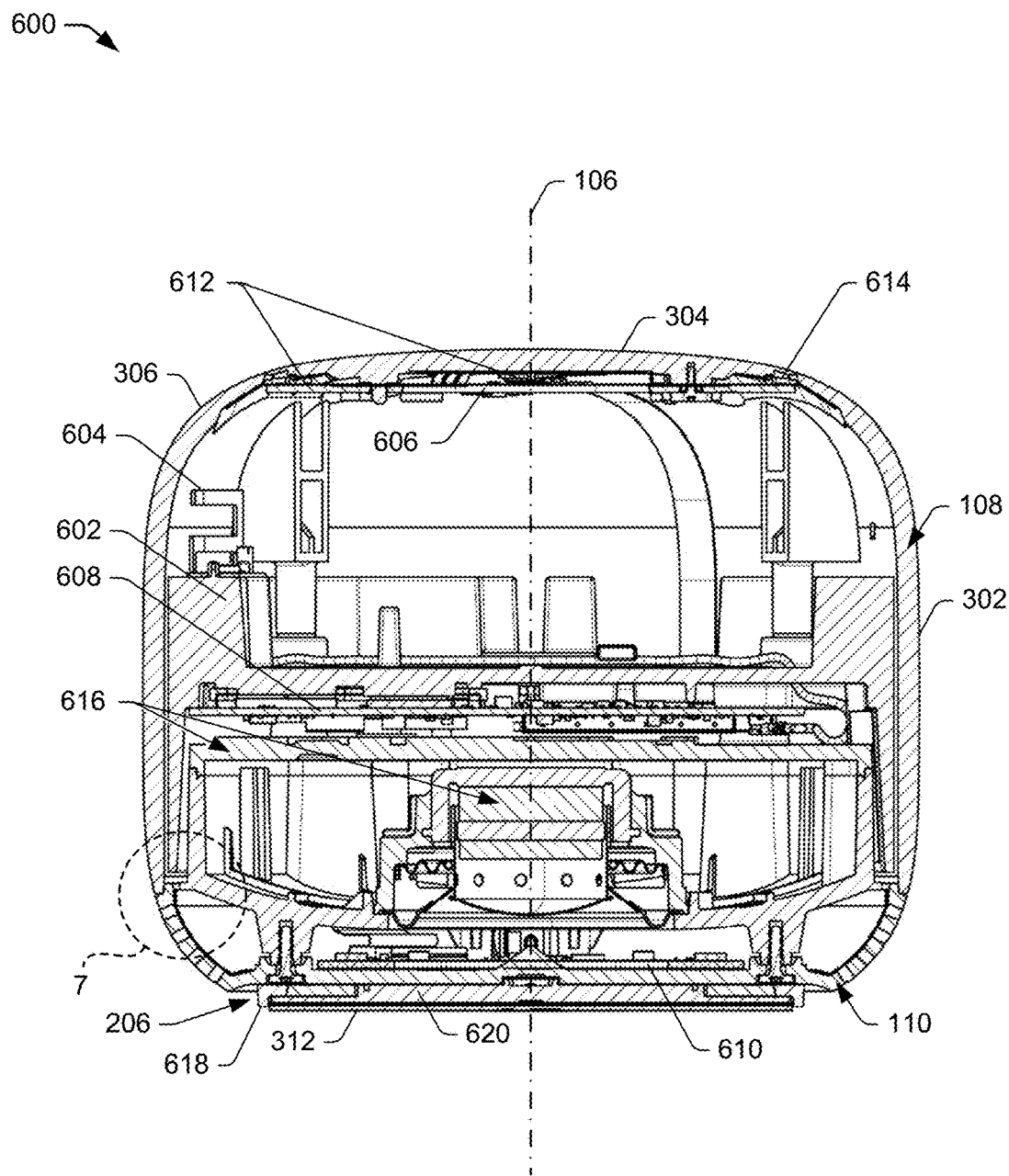
FIG. 6 illustrates a sectional view of the range extender device, taken along section line 6-6 in FIG. 4.

FIG. 6 illustrates a sectional view 600 of the range extender device 102 of FIG. 4 taken at the horizontal sectioning plane and in the direction indicated by section line 6-6. The range extender device 102 includes various hardware components within the housing 104 in a compact assembly. For example, the range extender device 102 includes a heat sink assembly 602 supporting multiple antennas 604 attached thereto. The heat sink assembly 602 is positioned within the housing 104 proximate to an inner surface of the vertical wall 302 of the top housing member 108. In addition, the antennas 604 are positioned proximate (e.g., adjacent) to the inner surface of the vertical wall 302 within a tolerance distance of two millimeters.

The range extender device 102 also includes multiple printed circuit board assemblies (PCBAs), including first PCBA 606, second PCBA 608, and third PCBA 610. The PCBA 606 is positioned proximate to, and abuts, the top-end portion 304 of the top housing member 108. As is further described below, the PCBA 606 is coupled to one or more touch sensors 612, one or more light-emitting components 614, and one or more audio sensors (not shown in FIG. 6, described in relation to FIG. 12). The PCBA 606 is described further below with respect to FIG. 12. The PCBAs 606, 608, and 610 each include a printed circuit board (PCB), which may be, for example, a glass-reinforced epoxy laminate material, such as an FR4 material, and have multiple layers and/or electrical traces, plated through-holes for through-hole components, and/or pads for surface-mount components. At least one of the PCBAs 606, 608, and 610 includes one or more components configurable to implement a virtual assistant capable of processing audio input from the user to identify a query or command and initiating a corresponding function, including providing audio output that responds to the query or command.

The second PCBA 608 is positioned on an opposing side of the heat sink assembly 602 from the PCBA 606. In particular, the PCBA 608 is positioned between the heat sink assembly 602 and a speaker assembly 616. The speaker assembly 616 is positioned between the PCBA 608 and the third PCBA 610. The PCBA 610 is positioned between the speaker assembly 616 and the bottom housing member 110. Abutting the exterior of the bottom housing member 110 is the light ring assembly 206, which includes an annular light guide 618 and a reflector 620. The light ring assembly 206 abuts the foot 312.

The top housing member 108 also includes recesses in the inner surface of top-end portion 304. The top housing member 108 is formed of a partially translucent material (e.g., polymer or thermoplastic) such that light can pass through the material if the thickness of the material is below a threshold value. For example, the light-emitting components 614 (e.g., light-emitting diode (LED)) connected to the PCBA 606 can radiate light into a recess on the inner surface of the top housing member 108. Based on the thickness of the top housing member 108 being below the threshold value at a location aligned with the light-emitting component 614, such as between the recess and the outer surface of the top-end portion 304, the light passes through the top housing member 108 at that translucent location. The light can correspond to an operating status or functionality of the range extender device 102. Any suitable location on the top housing member 108 may be used to provide a status light.

The top housing member 108, at the top-end portion 304 and the rounded edges 306, has a substantially uniform thickness. For example, inner and outer surfaces of the rounded edges 306 and the top-end portion 304 follow a substantially same curve. The vertical walls 302 of the top housing member 108, however, may not include a uniform thickness, due to the outer surface of the vertical wall 302 having a curve while the inner surface of the vertical wall 302 has a substantially zero-draft surface (e.g., straight surface with approximately zero taper). In aspects, the zero-draft surface is substantially parallel to the central axis 106 such that an angle between the central axis 106 and the zero-draft surface is less than five degrees. This zero-draft inner surface of the vertical wall 302 enables the components within the housing to be slidably removable for easy disassembly and/or slidably insertable for easy assembly. A more detailed view of this aspect is shown in FIG. 7.

Figure 7:
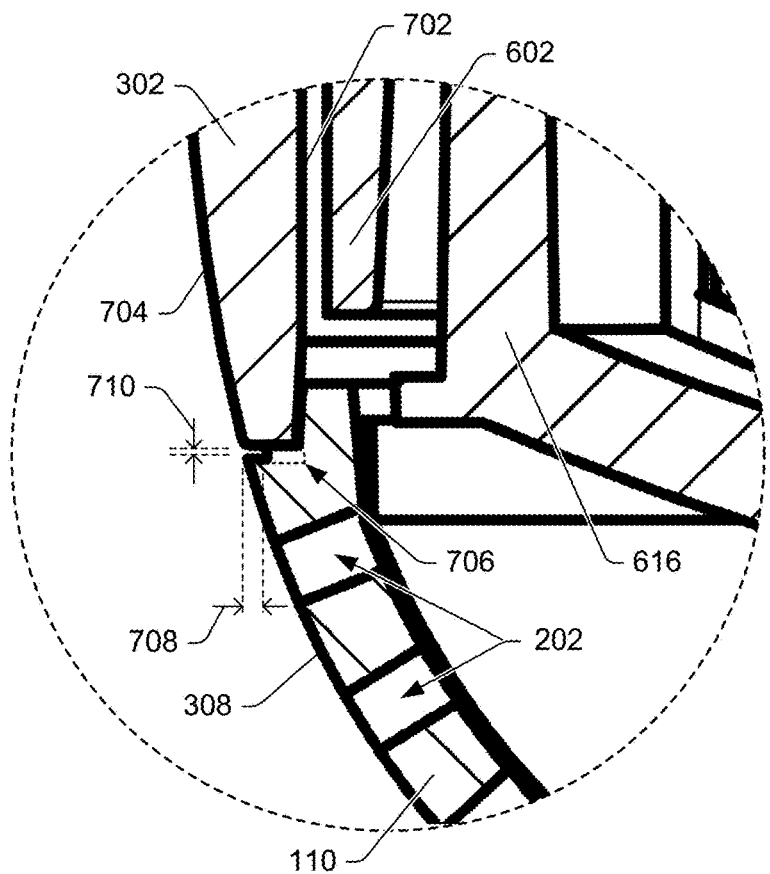
FIG. 7 illustrates an enlarged view of a portion of the rear sectional view of FIG. 5, showing a connection point between top and bottom housing members of the housing.

FIG. 7 illustrates an enlarged view 700 of a portion of the sectional view 600 of FIG. 6, as indicated by a dashed circle in FIG. 6, and shows a connection point between top and bottom housing members 108, 110 of the housing 104. In the enlarged view 700, the vertical wall 302 of the top housing member 108 is connected to the bottom housing member 110. As described above, the vertical wall 302 of the top housing member 108 includes a non-uniform thickness based on a zero-draft inner surface 702 and a curved outer surface 704. The curved outer surface 704 provides a smooth surface for the exterior of the range extender device 102 while the zero-draft inner surface 702 enables easy insertion or removal of internal components of the range extender device 102. Also shown in the enlarged view 700 is a portion of the heat sink assembly 602 and a portion of the speaker assembly 616. The bottom housing member 110 includes holes 202 (e.g., through-holes) in the rounded edge 308, where a respective hole 202 is perpendicular to the exterior surface of the bottom housing member 110 at a location of the respective hole 202.

The housing 104 includes a vertical step member 706 that interfaces the bottom housing member 110 to the vertical wall 302 of the top housing member 108. The vertical step member 706 is inset toward the central axis 106 of the housing 104 (offset from outer surfaces of the top and bottom housing members 108, 110) by a distance x 708 that is within a range of approximately 0.1 mm to approximately 0.3 mm. The vertical step member 706 includes a height y 710 that is within a range of approximately 0.1 mm to approximately 0.5 mm. The vertical step member 706 creates a horizontal gap (e.g., the seam 112 from FIG. 1) between the outer surfaces of the top housing member 108 and the bottom housing member 110, with the gap including a height equal to the height y 710 of the vertical step member 706 and a depth equal to the distance x 708 that the vertical step member 706 is inset. The resulting gap is substantially uniform from the perspective of a user. Without the vertical step member 706, the connection between the top housing member 108 and the bottom housing member 110 may create a seam that is more-easily perceived by the human eye as being non-uniform in height. Accordingly, the gap created by the vertical step member 706 is less likely to be perceived, by the user, as not being uniform.

Figure 8:
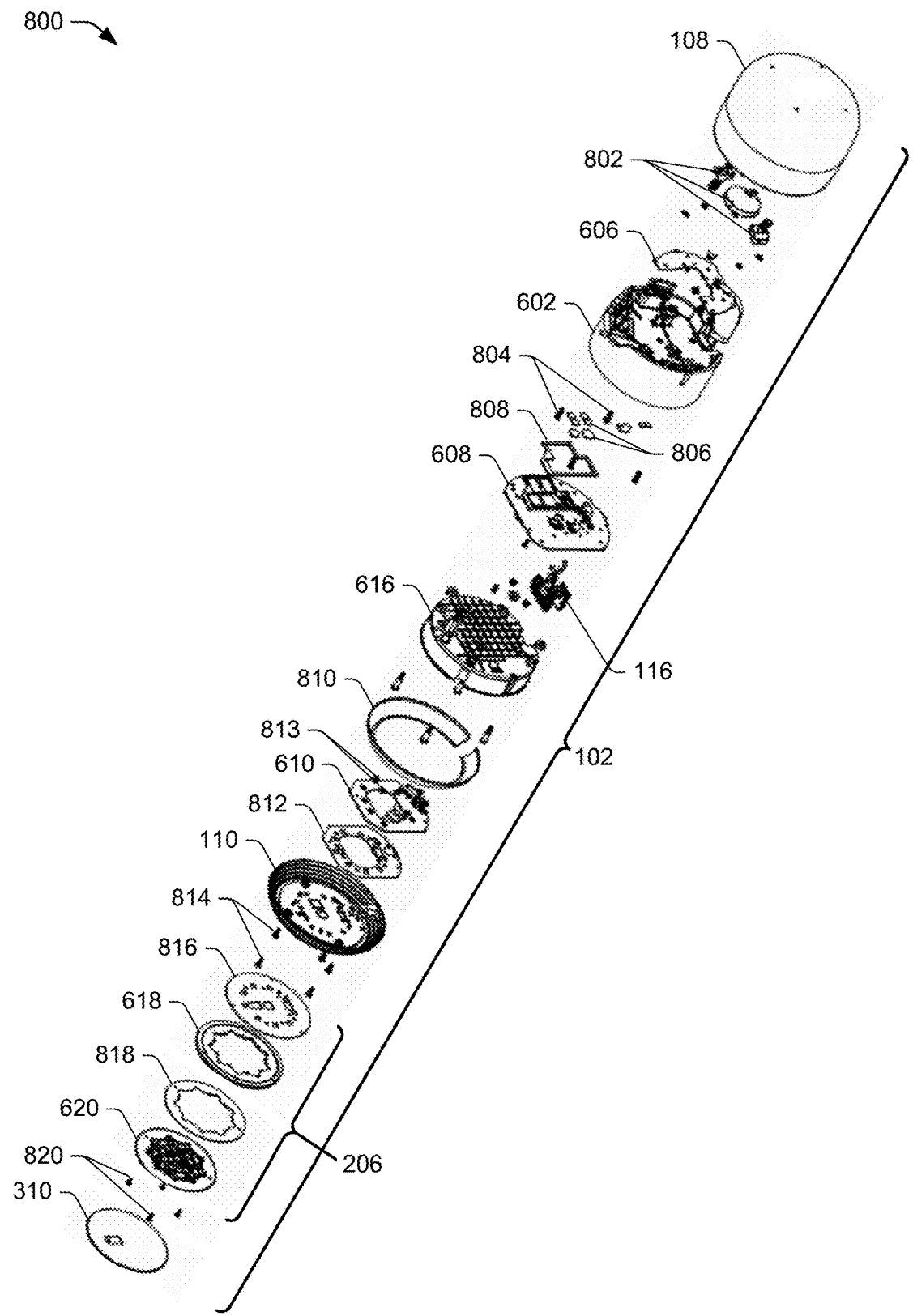
FIG. 8 illustrates an exploded view of the range extender device from FIG. 1.

FIG. 8 illustrates an example exploded view 800 of the range extender device 102. As generally shown in FIG. 8, touch sensors 802 are positioned between the PCBA 606 and the top housing member 108. In particular, the touch sensors 802 are positioned proximate to, and abut, the inner surface of the top-end portion 304 of the top housing member 108 to detect touch input to the top surface of the top housing member 108. The heat sink assembly 602 is positioned between the PCBA 606 and the PCBA 608. Fasteners 804 can be used to secure the heat sink assembly 602 to the top housing member 108. Any suitable fastener may be used, such as screws, bolts, rivets, etc. In aspects, included between the heat sink assembly 602 and the PCBA 608 is a thermal interface material 806 (e.g., thermal gel, thermal pads, etc.) and an electromagnetic (EMI) gasket 808.

The PCBA 608 is positioned between the heat sink assembly 602 and the speaker assembly 616. The privacy switch 116 is included proximate (e.g., adjacent) to the speaker assembly 616. Speaker mesh 810 is positioned adjacent to the bottom housing member 110 along the curved edge 308. In aspects, the speaker mesh 810 is assembled to the bottom housing 110 with adhesive on the speaker mesh 810. The speaker mesh 810 limits audio distortion and reduces resonance peak, in addition to reducing dust or liquid ingress into the holes in the bottom housing member 110. Below the speaker assembly 616 is the PCBA 610, which includes one or more LEDs that radiate light into the light ring assembly 206. The PCBA 610 can be attached to the bottom housing member 110 via pressure-sensitive adhesive (PSA) 812, or other adhesive, and/or one or more fasteners 813. Additional fasteners 814 can be used to secure the bottom housing member 110 to the speaker assembly 616, or to secure the bottom housing member 110 to the heat sink assembly 602 via holes in the speaker assembly 616.

Connected to the bottom exterior surface of the bottom housing member 110 is the light ring assembly 206, which includes the annular light guide 618, the reflector 620, a light blocker 816, and a layer of PSA 818. The light blocker 816 causes the light to reflect between the annular light guide 618 and the reflector 620 to increase a brightness of the light. The light blocker 816 has the same function as the reflector 620 and may be formed from any suitable material, an example of which includes white and black PET film. The reflector 620 may have channels or surfaces coated or lined with a reflective material to reflect light, radiated by the LEDs on the PCBA 610, into the annular light guide 618. The annular light guide 618 diffuses the reflected light to provide the underglow underneath the housing 104. The PSA 818 adheres the reflector 620 to the annular light guide 618. The light ring assembly 206 is positioned between the bottom housing member 110 and the foot 312. Fasteners 820 can be used to secure the light ring assembly 206 to the bottom housing member 110. The foot 312 can be adhered to the light ring assembly 206 using any suitable adhesive (not shown), such as a PSA.

Figure 9:
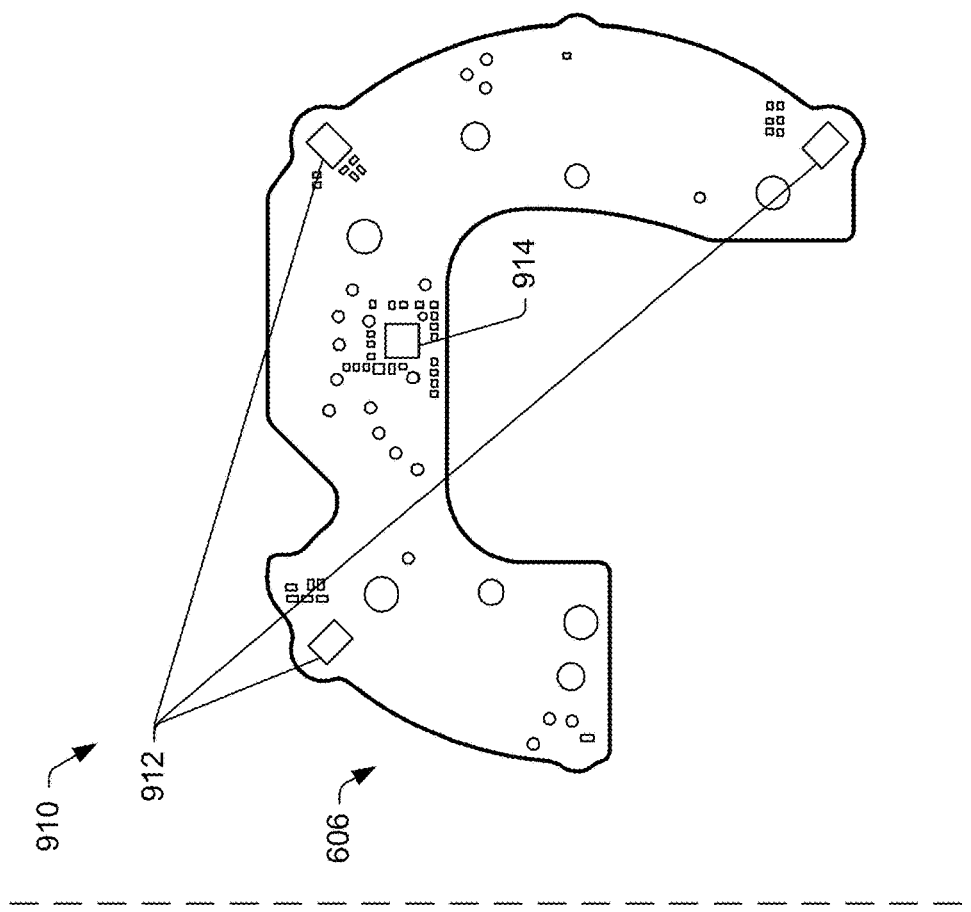
FIG. 9 illustrates top and bottom plan views of an example circuit board assembly implemented in the range extender device.
Figure 9:
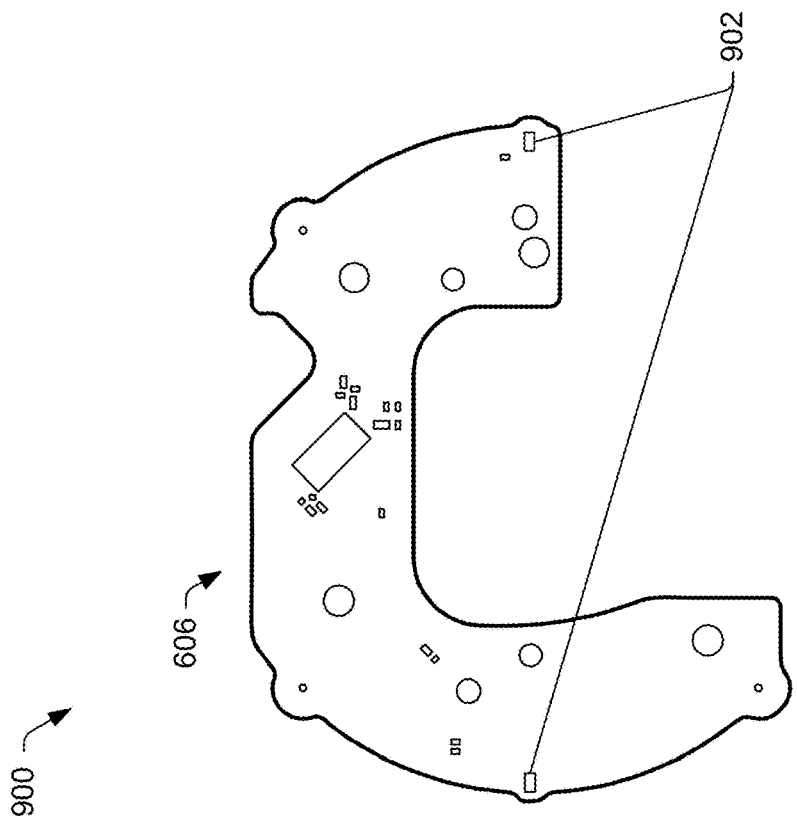

FIG. 9 illustrates top and bottom plan views 900 and 910, respectively, of the PCBA 606 from FIG. 8. The PCBA 606 includes light-emitting components 902, such as LEDs. The light-emitting components 902 are aligned with recesses in the inner surface of top-end portion 304 of the housing 104 to radiate light through the housing 104. Because the light radiates through the housing 104, the color of the light viewed by the user is based on the color of the material and paint of the housing 104. The light-emitting components 902 can be calibrated to emit light based on a status or function of the range extender device 102. Alternatively, the light-emitting components 902 can emit light to indicate a location of touch-sensitive regions on the housing 104.

The PCBA 606 also includes a plurality of audio sensors 912, such as microphones. In the illustrated example, the PCBA 606 includes three audio sensors 912. Each audio sensor 912 is aligned with a hole 114 in the top housing member 108. The PCBA 606 also includes a touch integrated circuit (IC) chip 914 that maps touch input, detected by the touch sensors 802, to particular functions. For example, the touch input may correspond to volume up, volume down, play, pause, next, skip, restart, previous track, and so on.

Figure 10:
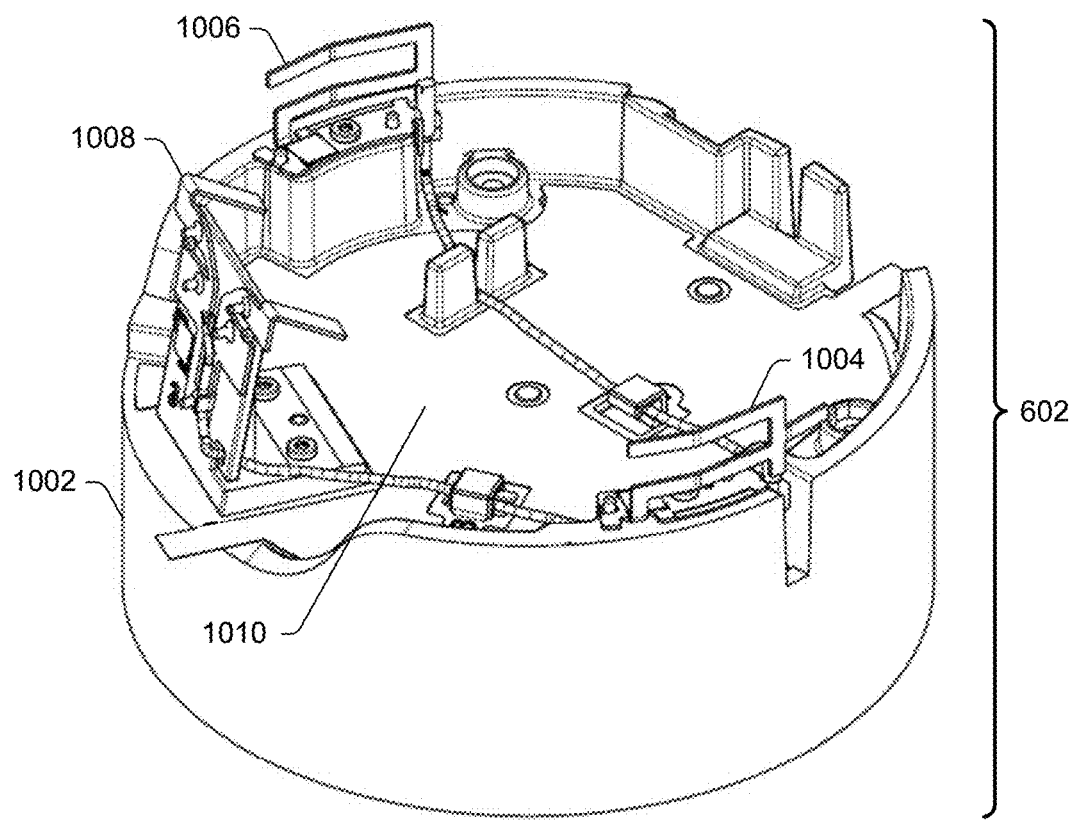
FIG. 10 illustrates a perspective view of an example heat sink assembly of the range extender device from FIG. 1.

FIG. 10 illustrates a perspective view 1000 of an example heat sink assembly 602 of the range extender device from FIG. 1. The heat sink assembly 602 includes a heat sink 1002 that has a generally cylindrical shape with a radius that is within a tolerance threshold distance (e.g., 0.1 mm) smaller than a radius of the inner surface of the vertical wall 302 of the top housing member 108. The heat sink 1002 may be formed from any suitable material, including die-cast aluminum. The heat sink 1002 is connected to a plurality of antennas, including antennas 1004, 1006, and 1008. The antennas 1004, 1006, and 1008 may be stampings that are fastened to the heat sink 1002 of the heat sink assembly 602. The antennas 1004, 1006, and 1008 may be configured for wireless communication over a wireless network, such as Bluetooth™, Thread™, and Wi-Fi®, respectively.

In addition, the heat sink assembly 602 includes a heat spreader 1010 abutting the heat sink 1002. The heat spreader 1010 is positioned between the heat sink 1002 and the PCBA 606, which is adjacent to the top-end portion 304 of the top housing member 108.

Figure 11:
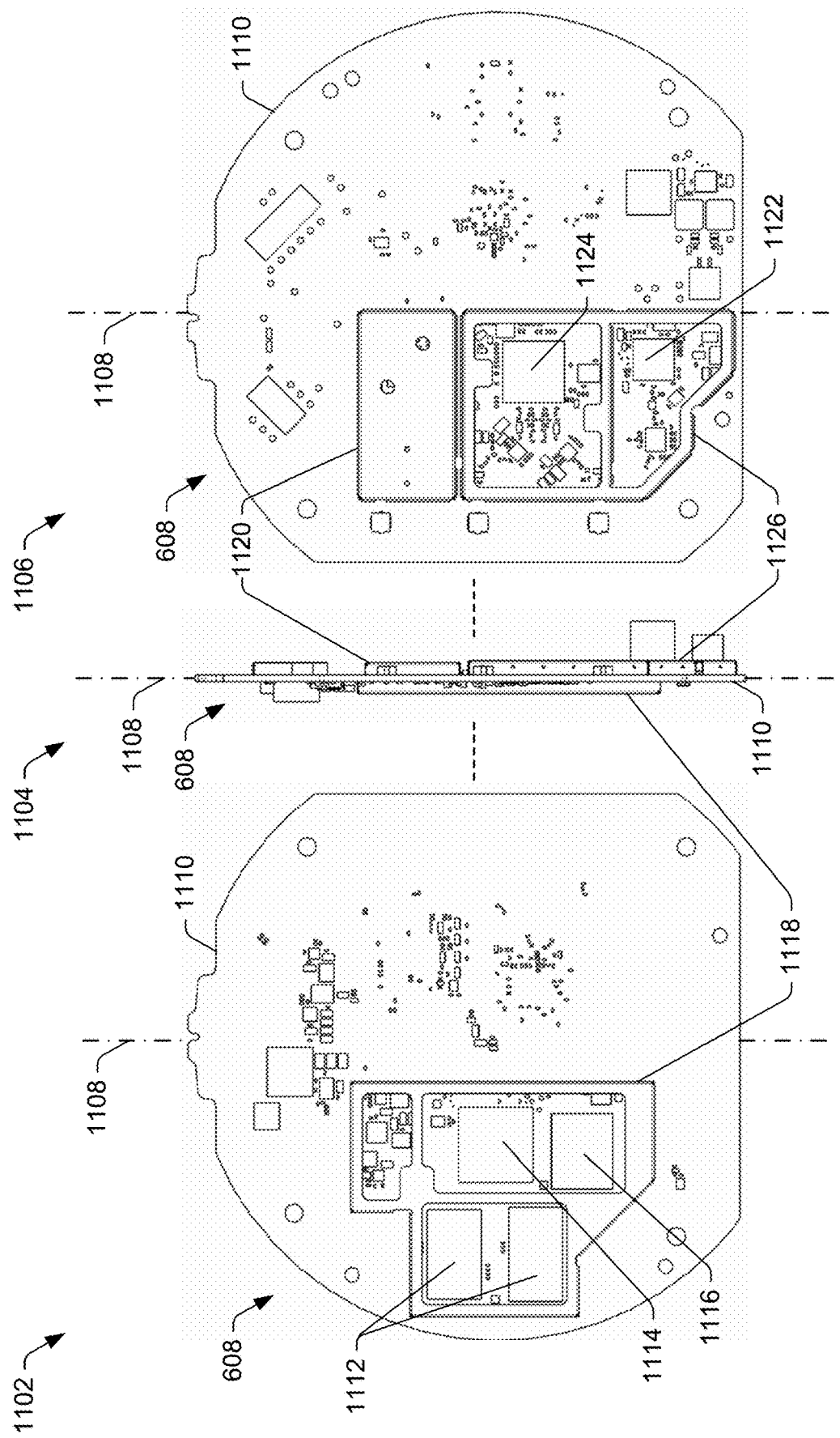
FIG. 11 illustrates various views of an example circuit board assembly of the range extender device from FIG. 1.

FIG. 11 illustrates various views of an example PCBA 608 of the range extender device from FIG. 1, including a top plan view 1102, a right elevational view 1104, and a bottom plan view 1106. The PCBA 608 is positioned within the housing 104 and proximate (e.g., adjacent) to the heat sink assembly 602, as described above in relation to FIG. 8. As illustrated in the top plan view 1102, the PCBA 608 is oriented based on an axis 1108. The axis 1108 is aligned with a plane defined by a PCB 1110 of the PCBA 608. The PCBA 608 includes one or more memory devices 1112, such as one or more double data rate memories. The PCBA 608 also includes a system-on-chip (SoC) 1114, and non-volatile memory 1116 (e.g., NAND flash memory). In addition, the PCBA 608 includes a shield frame 1118 around the SoC 1114, the non-volatile memory 1116, and the one or more memory devices 1112.

The PCBA 608 also includes a second shield frame 1120 that shields a first wireless network module (not shown), such as a 2.4 GHz Wi-Fi module. Additional components of the PCBA 608 include a thread control block 1122, a second wireless network module 1124 (e.g., a 5 GHz Wi-Fi module), and a third shield frame 1126 that shields the thread control block 1122 and the second wireless network module 1124.

The arrangement of components on the PCBA 608 illustrated in FIG. 11 are shown as an example only and are not to be construed as limiting. The components of the PCBA 608 can be implemented in any suitable configuration on the PCB 1110 for implementing aspects of the range extender device 102.

Figure 12:
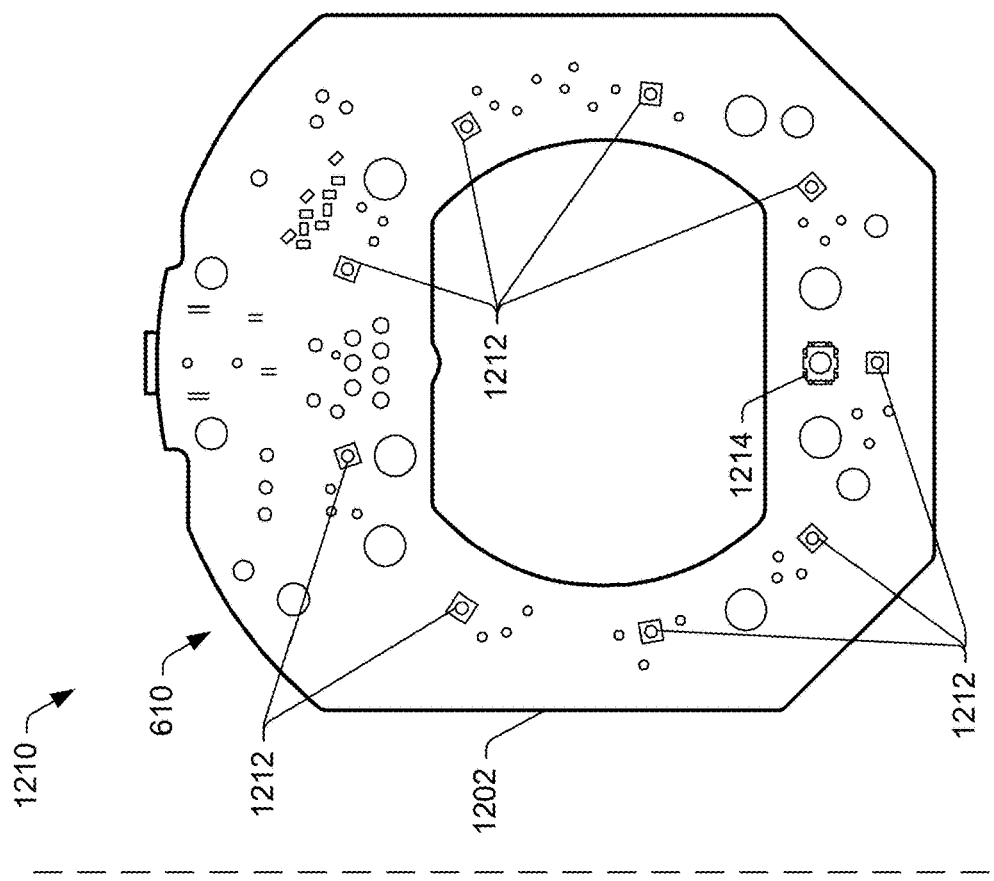
FIG. 12 illustrates top and bottom plan views of an example additional circuit board assembly of the range extender device from FIG. 1.
Figure 12:
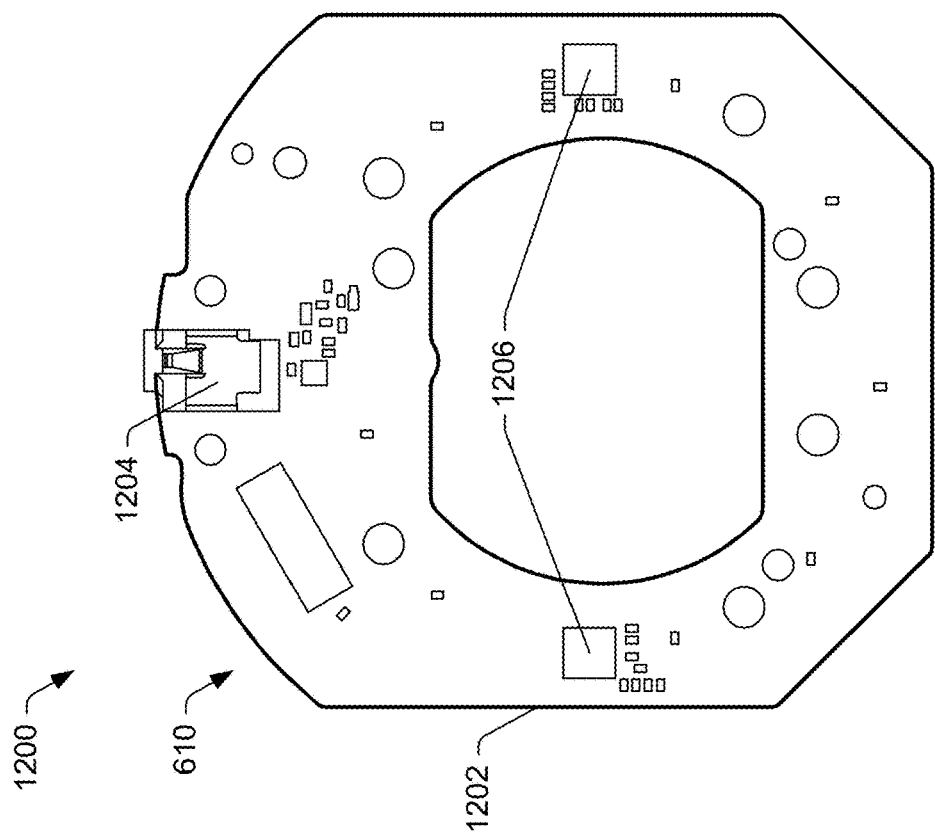

FIG. 12 illustrates a top plan view 1200 and a bottom plan view 1210 of an example PCBA 610 of the range extender device from FIG. 1. The PCBA 610 includes at least a PCB 1202, an electrical power connector 1204 (e.g., barrel jack connector), and one or more LED drivers 1206. The LED drivers 1206 are configured to drive one or more LEDs 1212 connected to the PCB 1202. In the illustrated example, the PCBA 610 includes nine LEDs 1212. As described above, the LEDs 1212 radiate light into the reflector of the light ring assembly 206. The LEDs 1212 can be configured to radiate any suitable color and/or flash pattern corresponding to an operational state of the range extender device 102. The PCBA 610 also includes a reset mechanism 1214 that, when actuated, resets one or more settings or functions of the range extender device 102.

Example Computing System

Figure 13:
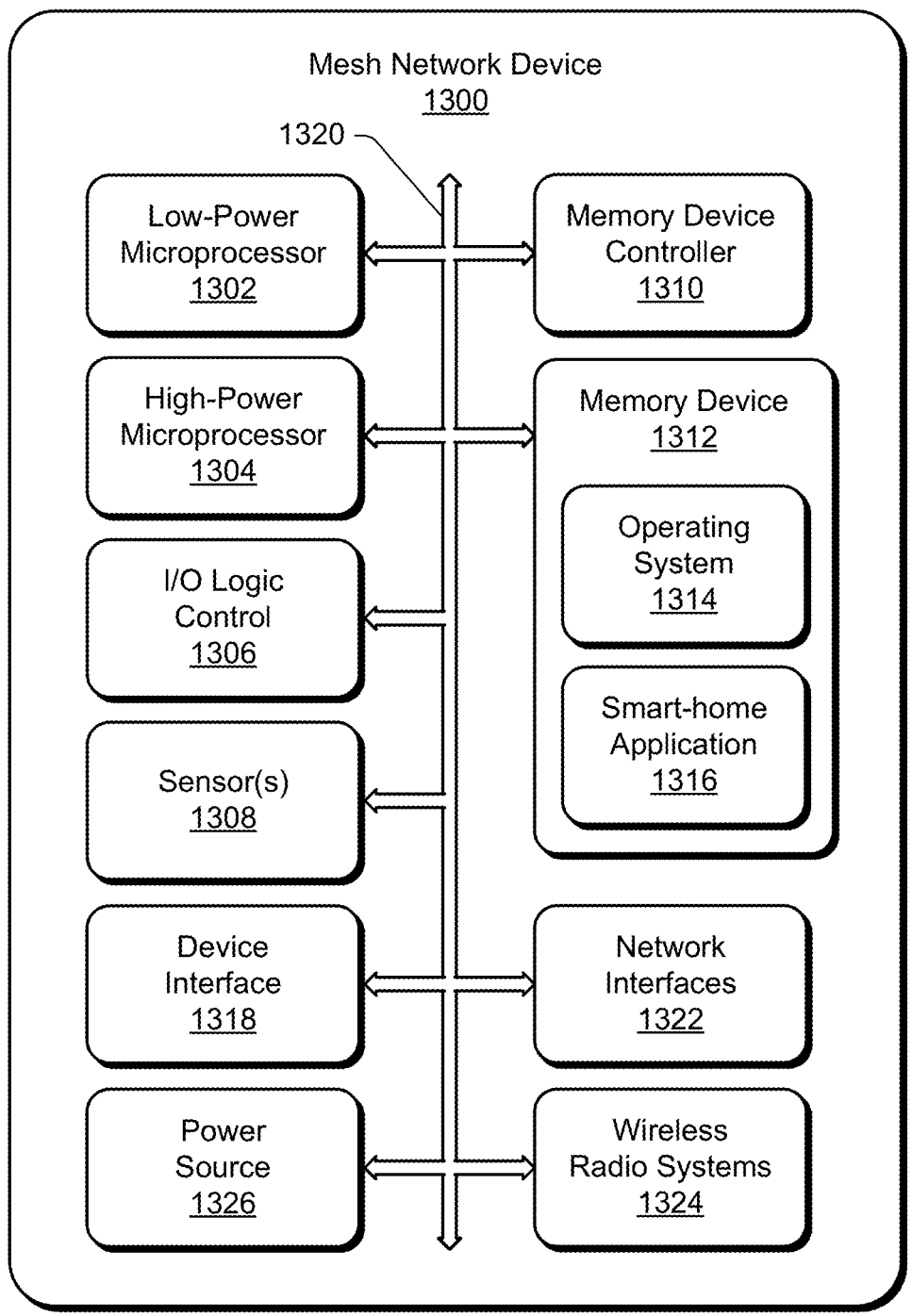
FIG. 13 illustrates an example mesh network device that can be implemented as any type of client, server, and/or electronic device as described with reference to FIGS. 1-12 to implement a range extender device.

FIG. 13 is a block diagram illustrating an example mesh network device 1300 that can be implemented as any mesh network device in a mesh network in accordance with one or more aspects of the range extender device described herein. The device 1300 can be integrated with electronic circuitry, microprocessors, memory, input output (I/O) logic control, communication interfaces and components, as well as other hardware, firmware, and/or software to implement the device in a mesh network. Further, the mesh network device 1300 can be implemented with various components, such as with any number and combination of different components as further described with reference to the example device shown in FIG. 12.

In this example, the mesh network device 1300 includes a low-power microprocessor 1302 and a high-power microprocessor 1304 (e.g., microcontrollers or digital signal processors) that process executable instructions. The device also includes an input-output (I/O) logic control 1306 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 1302 and the high-power microprocessor 1304 can also support one or more different device functionalities of the device. For example, the high-power microprocessor 1304 may execute computationally intensive operations, whereas the low-power microprocessor 1302 may manage less-complex processes such as detecting a hazard or temperature from one or more sensors 1308. The low-power processor 1302 may also wake or initialize the high-power processor 1304 for computationally intensive processes.

The one or more sensors 1308 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 1308 may include any one or a combination of temperature sensors, humidity sensors, hazard-related sensors, security sensors, other environmental sensors, accelerometers, microphones, optical sensors up to and including cameras (e.g., charged coupled-device or video cameras), active or passive radiation sensors, GPS receivers, and radio frequency identification detectors. In implementations, the mesh network device 1300 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 1300 includes a memory device controller 1310 and a memory device 1312, such as any type of a nonvolatile memory and/or other suitable electronic data storage device. The mesh network device 1300 can also include various firmware and/or software, such as an operating system 1314 that is maintained as computer executable instructions by the memory and executed by a microprocessor. The device software may also include a smart-home application 1316 that implements aspects of the range extender device. The mesh network device 1300 also includes a device interface 1318 to interface with another device or peripheral component. Further, the mesh network device 1300 includes an integrated data bus 1320 that couples the various components of the mesh network device for data communication between the components. The data bus in the mesh network device may also be implemented as any one or a combination of different bus structures and/or bus architectures.

The device interface 1318 may receive input from a user and/or provide information to the user (e.g., as a user interface), and a received input can be used to determine a setting. The device interface 1318 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 1318 may also receive inputs from any number of peripherals, such as buttons, a keypad, a switch, a microphone, and an imager (e.g., a camera device).

The mesh network device 1300 can include network interfaces 1322, such as a mesh network interface for communication with other mesh network devices in a mesh network, and an external network interface for network communication, such as via the Internet. The mesh network device 1300 also includes wireless radio systems 1324 for wireless communication with other mesh network devices via the mesh network interface and for multiple, different wireless communications systems. The wireless radio systems 1324 may include Wi-Fi, Bluetooth™, mobile broadband, Bluetooth Low Energy™ (BLE), and/or point-to-point IEEE 802.15.4. Each of the different radio systems can include a radio device, antenna, and chipset that is implemented for a particular wireless communications technology. The mesh network device 1300 also includes a power source 1326, such as a battery and/or to connect the device to line voltage. An AC power source may also be used to charge the battery of the device.

Figure 14:
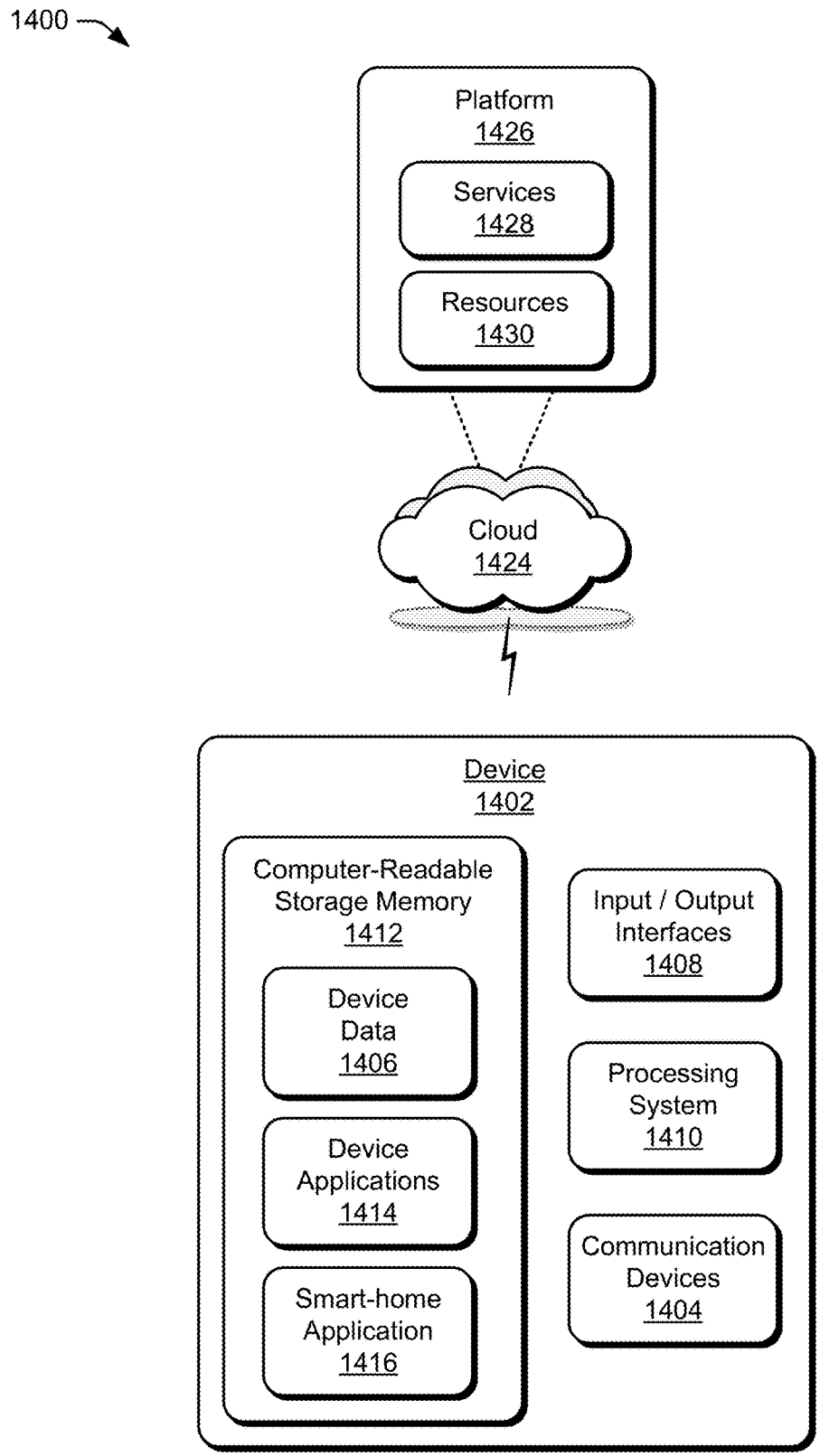
FIG. 14 illustrates an example system with an example device that can implement aspects of the range extender device.

FIG. 14 is a block diagram illustrating an example system 1400 that includes an example device 1402, which can be implemented as any mesh network device that implements aspects of the range extender device 102 as described with reference to the previous FIGS. 1-12. The example device 1402 may be any type of computing device, client device, mobile phone, tablet, communication, entertainment, gaming, media playback, and/or other type of device. Further, the example device 1402 may be implemented as any other type of mesh network device that is configured for communication on a mesh network, such as a thermostat, hazard detector, camera, light unit, commissioning device, router, border router, joiner router, joining device, end device, leader, access point, a hub, and/or other mesh network devices.

The device 1402 includes communication devices 1404 that enable wired and/or wireless communication of device data 1406, such as data that is communicated between the devices in a mesh network, data that is being received, data scheduled for broadcast, data packets of the data, data that is synchronized between the devices, etc. The device data can include any type of communication data, as well as audio, video, and/or image data that is generated by applications executing on the device. The communication devices 1404 can also include transceivers for cellular phone communication and/or for network data communication.

The device 1402 also includes input/output (I/O) interfaces 1408, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 1402 includes a processing system 1410 that may be implemented at least partially in hardware, such as with any type of microprocessors, controllers, or the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1402 may further include any type of a system bus or other data and command transfer system that couples the various components within the device. A system bus can include any one or combination of different bus structures and architectures, as well as control and data lines.

The device 1402 also includes computer-readable storage memory 1412, such as data storage devices that can be accessed by a computing device, and that provide persistent storage of data and executable instructions (e.g., software applications, modules, programs, functions, or the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1412 provides storage of the device data 1406 and various device applications 1414, such as an operating system that is maintained as a software application with the computer-readable storage memory 1412 and executed by the processing system 1410. The device applications may also include a device manager, such as any form of a control application, software application, signal processing and control module, code that is native to a particular device, a hardware abstraction layer for a particular device, and so on. In this example, the device applications also include a smart-home application 1416 that implements aspects of the range extender device, such as when the example device 1402 is implemented as any of the mesh network devices described herein.

In aspects, at least part of the techniques described for the range extender device may be implemented in a distributed system, such as over a "cloud" 1424 in a platform 1426. The cloud 1424 includes and/or is representative of the platform 1426 for services 1428 and/or resources 1430.

The platform 1426 abstracts underlying functionality of hardware, such as server devices (e.g., included in the services 1428) and/or software resources (e.g., included as the resources 1430), and communicatively connects the example device 1402 with other devices, servers, etc. The resources 1430 may also include applications and/or data that can be utilized while computer processing is executed on servers that are remote from the example device 1402. Additionally, the services 1428 and/or the resources 1430 may facilitate subscriber network services, such as over the Internet, a cellular network, or Wi-Fi network. The platform 1426 may also serve to abstract and scale resources to service a demand for the resources 1430 that are implemented via the platform, such as in an interconnected device embodiment with functionality distributed throughout the system 1400. For example, the functionality may be implemented in part at the example device 1402 as well as via the platform 1426 that abstracts the functionality of the cloud 1424.

Further to the descriptions above, a user (e.g., guest or host) may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Several examples are described below.

Example 1. A range extender device comprising: a housing comprising: a top housing member having a generally cylindrical vertical wall and a top-end portion connected to a first end of the vertical wall via rounded corners, the vertical wall being generally cylindrical around a central axis and having an inner surface and an opposing outer surface, at least a portion of the vertical wall having non-uniform thickness in a direction of the longitudinal axis based on the outer surface of the vertical wall being curved in the direction of the longitudinal axis and the inner surface of the vertical wall being substantially parallel to the longitudinal axis, the top-end portion being concave down in a side view of the top-end portion; and a bottom housing member connected to the top housing member at a second end of the vertical wall, the bottom housing member having a bottom exterior surface and an opposing interior surface, the bottom exterior surface defining a plane that is substantially perpendicular to the central axis, the bottom housing member comprising a curved edge between the bottom exterior surface and the vertical wall of the top housing member; an audio sensor positioned within the housing and proximate to the top-end portion of the top housing member; a heat sink assembly comprising a heat sink and one or more antennas, the heat sink having a cylindrical shape with a radius that is within a tolerance threshold distance smaller than a radius of the inner surface of the vertical wall of the top housing member; a circuit board assembly positioned within the housing and proximate to the heat sink assembly, the circuit board assembly communicatively coupled to the one or more antennas to cause the one or more antennas to provide a radio node for a wireless mesh network; a speaker assembly positioned within the housing and connected to the circuit board assembly, the speaker assembly aligned with a plurality of holes in the bottom housing member; and a light ring assembly connected to the bottom exterior surface of the bottom housing member, the light ring assembly configured to radially reflect light away from the central axis and diffuse the light to provide a glow under the bottom housing member.

Example 2. The range extender device of example 1, further comprising a touch sensor abutting the top-end portion from the top housing member, the touch sensor operable to detect touch input by a user that touches an area of a top surface of the top housing member that is aligned with the touch sensor.

Example 3. The range extender device of example 2, wherein the circuit board assembly comprises a first circuit board assembly, and the range extender device further comprises: a second circuit board assembly connected to the audio sensor and the touch sensor, the first circuit board assembly operable to process: audio input received by the audio sensor; and touch input detected by the touch sensor; and a third circuit board assembly connected to a light-emitting component, the third circuit board operable to control the light-emitting component to radiate the light into the light ring assembly.

Example 4. The range extender device of example 3, wherein: the second circuit board assembly is positioned proximate to the top-end portion of the top housing member; and the audio sensor is aligned with a hole in the top-end portion of the top housing member.

Example 5. The range extender device of example 1, wherein the one or more antennas include a dual-band antenna and a single-band antenna that are equally spaced apart in a radial direction around the central axis.

Example 6. The range extender device of example 1, wherein the light ring assembly is adhered to the exterior surface of the bottom housing member.

Example 7. The range extender device of example 1, further comprising a cantilever member formed within the light ring assembly and connected to the light ring assembly at a fulcrum, wherein the cantilever member: is coplanar with the plane defined by the light ring assembly; and is bendable, by a force applied to a free end of the cantilever member, to interface with a reset mechanism on the circuit board assembly.

Example 8. The range extender device of example 1, further comprising a light-emitting diode positioned within the housing and proximate to the top-end portion of the top housing member, the light-emitting diode operable to radiate light through a translucent portion of the top-end portion to cause the light to exit a top surface of the top housing member.

Example 9. The range extender device of example 1, wherein: the bottom housing member includes a vertical step member that abuts the top housing member; the vertical step member is inset in a direction toward the central axis; and the vertical step member causes a gap to be formed horizontally between the bottom housing member and the top housing member and with a substantially uniform height.

Example 10. The range extender device of example 1, further comprising a privacy control to toggle the audio sensor on and off.

Example 11. A system comprising: a plurality of antennas configured to transmit and receive communication signals; a circuit board assembly communicatively connected to the plurality of antennas to provide a radio node to a wireless mesh network; a heat sink positioned proximate to the circuit board; a microphone connected to the circuit board; a speaker assembly connected to the circuit board such that the circuit board is located between the speaker assembly and the heat sink; a housing having a generally-cylindrical shape around a central axis, the housing comprising: first and second housing members connected to one another to form an enclosure around the multiple antennas, the circuit board assembly, the heat sink, the microphone, and the speaker assembly; the first housing member comprising a cylindrically-shaped vertical wall around the central axis and having an inner surface that is substantially parallel to the central axis; and the second housing member having a plurality of holes aligned with the speaker assembly; and a light ring assembly configured to provide a glow underneath the second housing member.

Example 13. The system of example 12, wherein the heat sink has a generally cylindrical body with a radius that is within a tolerance distance smaller than a radius of the inner surface of the vertical wall.

Example 14. The system of example 13, wherein the vertical wall comprises a non-uniform thickness based on the inner surface, which is substantially parallel to the central axis, and an opposing curved outer surface that is curved in a direction of the central axis.

Example 15. The system of example 12, wherein: the circuit board assembly includes a plurality of light-emitting diodes that radiate light; and the light ring assembly comprises: a reflector that reflects the light radially from the central axis; and an annular light guide that diffuses the reflected light to provide the glow underneath the housing.

Example 16. The system of example 15, wherein: the housing includes a vertical step member interfacing the first housing member to the second housing member; the vertical step member is offset from an exterior surface of the housing effective to cause a horizontal seam to be formed in the exterior surface of the housing; and the seam comprises a substantially uniform height.

Example 17. The system of example 12, wherein at least one of the first or second housing member is injection molded.

Example 18. The system of example 12, wherein: a portion of the housing is translucent at a recess formed in an inner surface of the housing; and the system further comprises a light-emitting diode that radiates light through the translucent portion of the housing to indicate an operation status of the system.

Example 19. The system of example 12, further comprising a cantilever member that: is formed in the light ring assembly; is coplanar with the light ring assembly; and interfaces with a reset mechanism on the circuit board assembly.

Example 20. The system of example 12, further comprising a privacy control positioned on the exterior surface of the housing, the privacy control switchable to toggle the audio sensor on and off.

Conclusion

Although aspects of the range extender device have been described in language specific to features and/or methods, the subject of the appended claims is not necessarily limited to the specific features or methods described. Rather, the specific features and methods are disclosed as example implementations of the range extender device, and other equivalent features and methods are intended to be within the scope of the appended claims. Further, various different aspects are described, and it is to be appreciated that each described aspect can be implemented independently or in connection with one or more other described aspects.

What is claimed is:

1. An electronic device comprising:
   a housing comprising:
      a top housing member having a wall and a top-end portion connected to a first end of the wall via rounded corners, the wall being generally cylindrical around a central axis and having an inner surface and an opposing outer surface; and
      a bottom housing member connected to the top housing member at a second end of the wall, the bottom housing member comprising a curved edge between a bottom exterior surface of the bottom housing member and the wall of the top housing member, at least a portion of the curved edge defining a plurality of holes that provide a path for audio output from an audio output device;
   a circuit board assembly positioned within the housing and including one or more light-emitting components, the circuit board assembly operable to control the one or more light-emitting components to radiate light; and
   a light ring assembly connected to the bottom exterior surface of the bottom housing member, the light ring assembly:
      being positioned between the bottom housing member and a mounting surface upon which the electronic device may rest;
      having a first radius that is smaller than a second radius of the bottom exterior surface of the bottom housing member;
      configured to radially reflect the light radiated by the light-emitting components away from the central axis and diffuse the light to provide a glow under the bottom housing member; and
      configured to provide sufficient space underneath the bottom housing member, based on at least a combination of the first radius and a height of the light ring assembly, for the diffused light to radiate underneath the bottom housing member and reflect off the mounting surface while the electronic device rests thereon to provide the glow under the bottom housing member.

2. The electronic device of claim 1, further comprising a touch sensor abutting the top-end portion from the top housing member, the touch sensor operable to detect touch input by a user that touches an area of a top surface of the top housing member that is aligned with the touch sensor.

3. The electronic device of claim 2, wherein the circuit board assembly comprises a first circuit board assembly, and the electronic device further comprises:
 an audio sensor positioned within the housing and proximate to the top-end portion of the top housing member; and
 a second circuit board assembly connected to the audio sensor and the touch sensor, the second circuit board assembly operable to process:
  audio input received by the audio sensor; and
  touch input detected by the touch sensor.

4. The electronic device of claim 3, further comprising a speaker assembly positioned within the housing and connected to the second printed circuit board assembly, wherein the speaker assembly is aligned with the plurality of holes in the bottom housing member.

5. The electronic device of claim 3, further comprising a privacy control to toggle the audio sensor on and off.

6. The electronic device of claim 5, wherein the privacy control is positioned on an exterior surface of the housing.

7. The electronic device of claim 3, further comprising a third circuit board assembly communicatively connected to one or more antennas to cause the one or more antennas to provide a radio node for a wireless mesh network.

8. The electronic device of claim 7, wherein the one or more antennas include a dual-band antenna and a single-band antenna.

9. The electronic device of claim 7, wherein the one or more antennas are positioned within a tolerance distance of two millimeters from the inner surface of the of the wall of the top housing member.

10. The electronic device of claim 1, wherein the light ring assembly is adhered to the bottom exterior surface of the bottom housing member.

11. The electronic device of claim 1, further comprising a light-emitting diode positioned within the housing and proximate to the top-end portion of the top housing member, the light-emitting diode operable to radiate light through a translucent portion of the top-end portion to cause the light to exit a top surface of the top housing member.

12. The electronic device of claim 1, wherein:
 the bottom housing member includes a step member that abuts the second end of the top housing member;
 the step member is inset in a direction toward the central axis; and
 the step member causes a gap to be formed between an outer surface of the bottom housing member and the outer surface of the top housing member in a radial direction around the central axis and with a substantially uniform height.

13. The electronic device of claim 12, wherein the bottom housing member is substantially shorter in a direction of the central axis than the top housing member such that the gap is located on a lower half of the housing.

14. The electronic device of claim 1, wherein the wall has a third radius within a range of 38 millimeters to 65 millimeters.

15. The electronic device of claim 1, wherein at least one of the top housing member or the bottom housing member is injection molded.

16. The electronic device of claim 1, wherein the light ring assembly comprises:
 a reflector that reflects the light radially away from the central axis; and
 an annular light guide that diffuses the reflected light to provide the glow under the bottom housing member.

17. The electronic device of claim 1, wherein the height of the light ring assembly is within a range of 1.75 millimeters to 2.25 millimeters.

18. The electronic device of claim 1, wherein the first radius of the light ring assembly is smaller than the second radius of the bottom exterior surface of the bottom housing member by a distance that is within a range of 3.5 millimeters to 4.25 millimeters.

19. The electronic device of claim 1, further comprising a heat sink positioned within the housing, the heat sink having a generally cylindrical shape with a third radius that is within a tolerance threshold distance smaller than a fourth radius of the inner surface of the wall of the top housing member.

20. The electronic device of claim 1, further comprising a foot to the light ring assembly, wherein:
 the foot has a third radius that is smaller than the first radius of the light ring assembly;
 the first radius of the light ring assembly is smaller than the second radius of the bottom exterior surface of the bottom housing member by an amount equal to a first distance;
 the third radius of the foot is smaller than the first radius of the light ring assembly by another amount equal to a second distance; and
 the first radius and the height of the light ring assembly combined with the third radius and a height of the foot provides sufficient space underneath the bottom housing member for the diffused light to radiate underneath the bottom housing member and reflect off the mounting surface while the electronic device rests thereon to provide the glow under the bottom housing member.

* * * * *